(12) United States Patent
Benedetto et al.

(10) Patent No.: US 11,628,705 B2
(45) Date of Patent: Apr. 18, 2023

(54) VARIABLE-LENGTH TIE ROD MADE OF PLASTIC MATERIAL

(71) Applicant: DENSO THERMAL SYSTEMS S.p.A., Poirino (IT)

(72) Inventors: Roberto Benedetto, Poirino (IT); Luca Bergamo, Poirino (IT)

(73) Assignee: DENSO THERMAL SYSTEMS S.P.A., Poirino (IT)

( * ) Notice: Subject to any disclaimer, the term of this patent is extended or adjusted under 35 U.S.C. 154(b) by 396 days.

(21) Appl. No.: 16/828,637

(22) Filed: Mar. 24, 2020

(65) Prior Publication Data

US 2020/0307347 A1    Oct. 1, 2020

(30) Foreign Application Priority Data

Mar. 27, 2019    (IT) .......................... 102019000004613

(51) Int. Cl.
| | | |
|---|---|---|
| *B60H 1/00* | (2006.01) | |
| *F24F 13/14* | (2006.01) | |
| *F16C 7/06* | (2006.01) | |
| *F16B 7/10* | (2006.01) | |

(52) U.S. Cl.
CPC .......... *B60H 1/00507* (2013.01); *F16C 7/06* (2013.01); *F24F 13/1426* (2013.01); *F16B 7/105* (2013.01); *F16C 2226/74* (2013.01)

(58) Field of Classification Search
CPC .. B60H 1/00507; B60H 1/00857; B60H 1/34; B60H 2001/3471; F16C 7/06; F16C 2226/74; F16C 2226/76; F16C 2226/80; F16C 2326/01; F16B 7/105; F24F 13/1426

See application file for complete search history.

(56) References Cited

U.S. PATENT DOCUMENTS

| | | | | | |
|---|---|---|---|---|---|
| 5,163,338 A | * | 11/1992 | Sharp | ...................... | F16C 1/223 403/379.2 |
| 5,394,770 A | * | 3/1995 | Boike | ...................... | F16C 1/14 403/104 |

(Continued)

FOREIGN PATENT DOCUMENTS

| | | | | |
|---|---|---|---|---|
| DE | 3537145 A1 | | 10/1986 | |
| EP | 892135 A1 | * | 1/1999 | ............. E05B 79/12 |

(Continued)

OTHER PUBLICATIONS

Italian Search Report and Written Opinion for priority IT Patent Application No. 102019000004613, dated Dec. 19, 2019, 8 pages.

*Primary Examiner* — Grant Moubry

(74) *Attorney, Agent, or Firm* — Amstrong Teasdale LLP

(57) ABSTRACT

A tie rod including a first tie rod part and a second tie rod part of plastic material, and a joint providing a length-adjustable connection between the first and second tie rod parts is provided. The joint includes a first and a second series of ribs made on the first and second tie rod parts, respectively. The first series of ribs is capable of engaging with the second series of ribs to define a relative longitudinal position of the first and second tie rod parts. The joint further includes a clip hinged to the first tie rod part and carrying the first series of ribs, the clip being foldable to snap onto the first tie rod part to lock an end of the second tie rod part within a seat of the first tie rod part.

9 Claims, 5 Drawing Sheets

(56) References Cited

U.S. PATENT DOCUMENTS

| | | | |
|---|---|---|---|
| 5,934,150 A * | 8/1999 | Srinivas | F16C 1/223 |
| | | | 403/104 |
| 10,352,350 B2 * | 7/2019 | Rake | F16C 1/14 |
| 11,330,900 B2 * | 5/2022 | Chen | F16M 11/38 |
| 2005/0205729 A1 * | 9/2005 | Wang | F16M 13/027 |
| | | | 248/161 |
| 2017/0159700 A1 * | 6/2017 | Stahl | F16C 7/06 |

FOREIGN PATENT DOCUMENTS

| | | | | |
|---|---|---|---|---|
| EP | 1160402 A1 | 12/2001 | | |
| FR | 2705744 A1 | 12/1994 | | |
| JP | S60161212 A | 8/1985 | | |
| WO | WO-2013177166 A1 * | 11/2013 | | F16K 1/22 |

* cited by examiner

VARIABLE-LENGTH TIE ROD MADE OF PLASTIC MATERIAL

CROSS-REFERENCE TO RELATED APPLICATIONS

This application claims the benefit of priority to Italian Patent Application No. 102019000004613, filed Mar. 27, 2019, the entire contents of which are hereby incorporated by reference herein.

FIELD OF THE INVENTION

The present invention refers in general to tie rods for transmitting motion between two parts, and particularly to tie rods used in automotive air-conditioning units.

BACKGROUND OF THE INVENTION

In air-conditioning units, tie rods are used to drive mixing flaps and to distribute air. They are generally made of plastic or metal and are connected to levers or gears for transmitting motion between actuators and the flaps inside the air-conditioning unit.

In conventional plastic tie rods, the distance between the ends of the tie rod may vary due to manufacturing tolerances and factors associated with stamping, causing irregularities in the transmission of motion between the two parts connected to the tie rod.

SUMMARY OF THE INVENTION

A purpose of the present invention is to provide a solution capable of at least partially overcoming the drawbacks of the prior art.

In light of the above purpose, the present invention provides a tie rod, particularly for an air conditioning unit, comprising a first tie rod part and a second tie rod part, both made of plastic material, said first tie rod part having an end provided with a seat, and said second tie rod part having an end designed to be inserted into the seat of the first tie rod part, and a joint designed to form an adjustable-length connection between said first and second tie rod parts, wherein the joint comprises a first and a second series of ribs formed on said first and second tie rod parts, respectively, said ribs lying transversely to the longitudinal direction of the tie rod and being arranged one after the other in the longitudinal direction of the tie rod, the first series of ribs being capable of engaging with the second series of ribs to define a relative longitudinal position of the tie rod parts with respect to each other, wherein the joint further comprises a clip hinged to the first tie rod part and carrying the first series of ribs, said clip being foldable so as to snap onto the first tie rod part to lock the end of the second tie rod part within the seat of the first tie rod part, and wherein the seat of the first tie rod part is designed to slidably guide the end of the second tie rod part when the clip is in the open position.

In the tie rod according to the present invention, the length adjustment system makes it possible to achieve the following advantages:

possibility of taking up play due to linkages in the unit;
simple adjustment;
possibility of adjusting the tie rod to several positions; and
possibility of adjusting the length after the tie rod has been installed in the air-conditioning unit.

According to one embodiment, when the clip is in the closed position, it forms a wall of the seat of the first tie rod part. Preferably, the clip is connected to the first tie rod part by a film hinge.

In particular, the clip may be rotated about an axis parallel to the longitudinal axis of the tie rod.

Preferably, one edge of the clip opposite the film hinge and a corresponding area of the seat of the first tie rod part are provided with snap fitting devices to lock the clip in the closed position.

In addition, at least one edge of the clip adjacent to the film hinge and a corresponding area of the seat of the first tie rod part may be provided with snap fitting devices to lock the clip in the closed position.

The second tie rod part may have an elastic end tooth protruding in the opposite direction of the second series of ribs of the second tie rod part, wherein a groove capable of receiving said elastic end tooth is made in a wall of the seat of the first tie rod part, with a stop being defined in said groove to prevent removal of the end of the second tie rod part from the seat of the first tie rod part.

According to a specific embodiment, the seat of the first tie rod part has an approximately rectangular cross section and the end of the second tie rod part has a cross sectional profile matching said cross-section.

In general, the clip and the first series of ribs are made of a single part together with the first tie rod part, and the second series of ribs is made of a single part together with the second tie rod part.

Additional features and advantages of the tie rod according to the present invention will become clearer from the following detailed description of an embodiment of the invention given in reference to the enclosed drawings, provided solely for illustration and non-limiting purposes.

DETAILED DESCRIPTION

Figure 1:
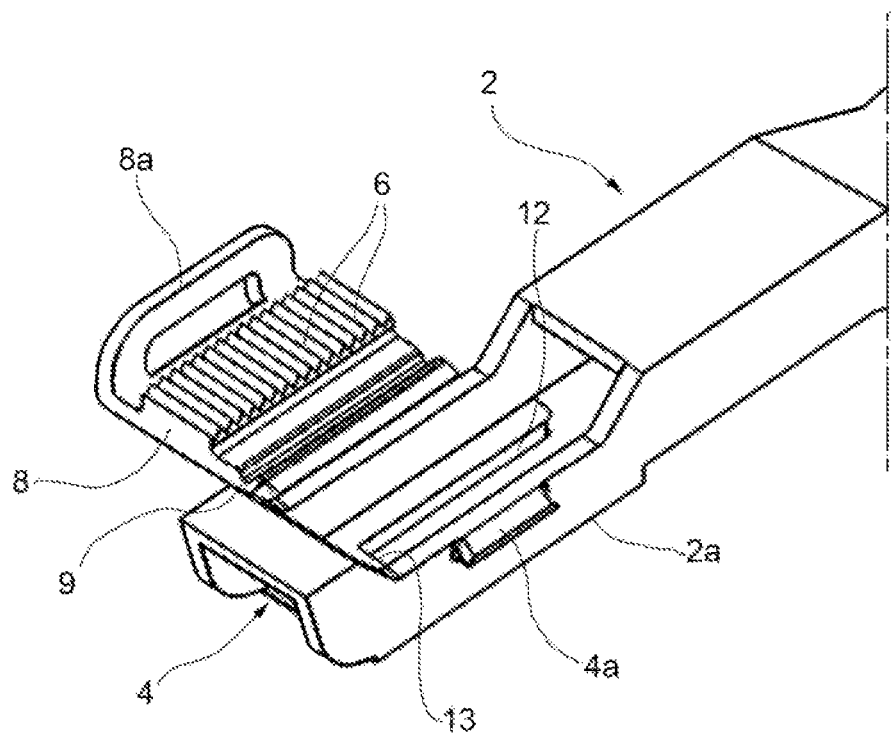
FIGS. 1 and 2 are perspective views from opposite sides of a first part of a tie rod according to the invention.
Figure 2:
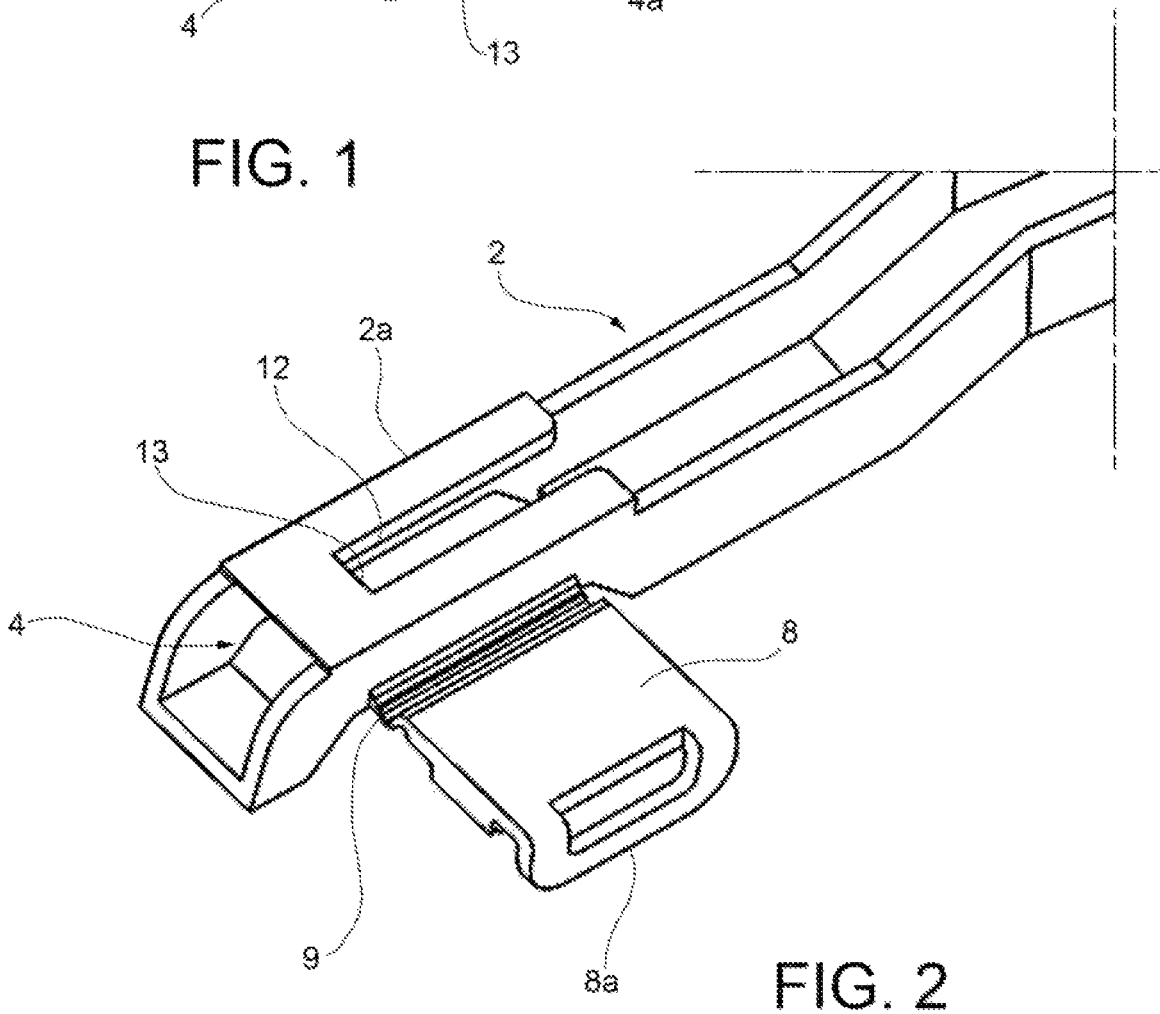
Figure 3:
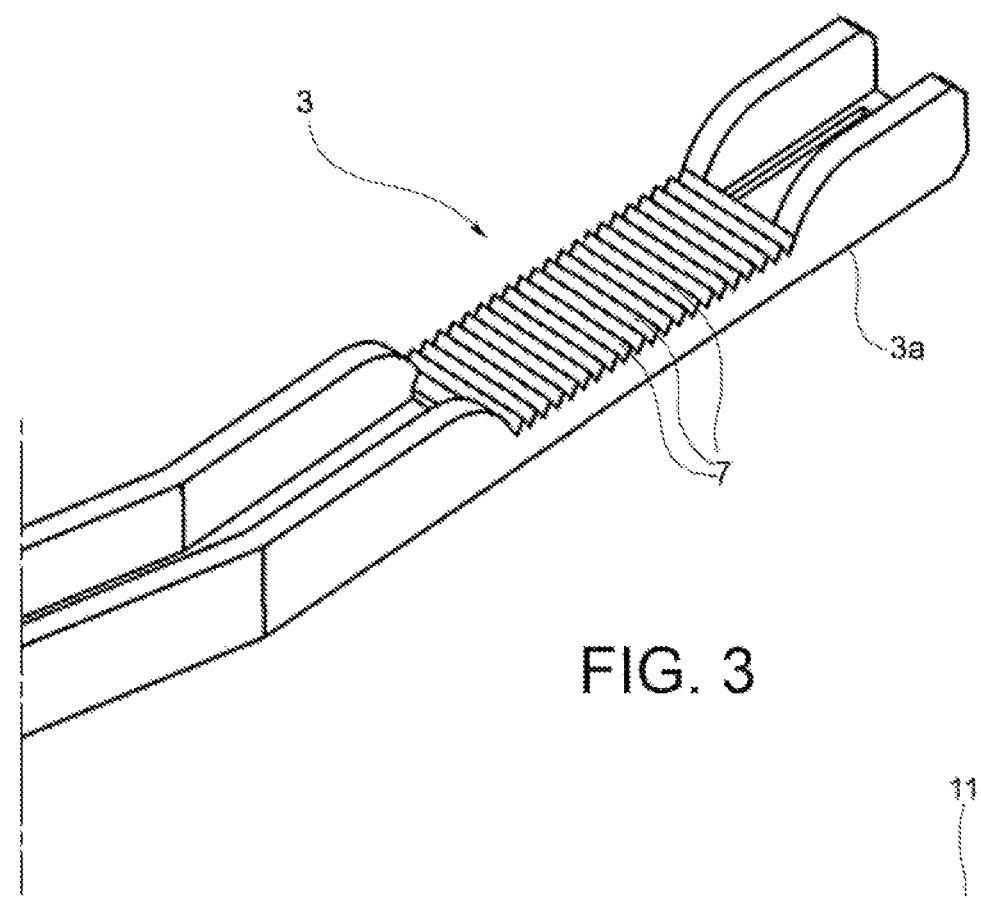
FIGS. 3 and 4 are perspective views from opposite sides of a second part of the tie rod.
Figure 4:
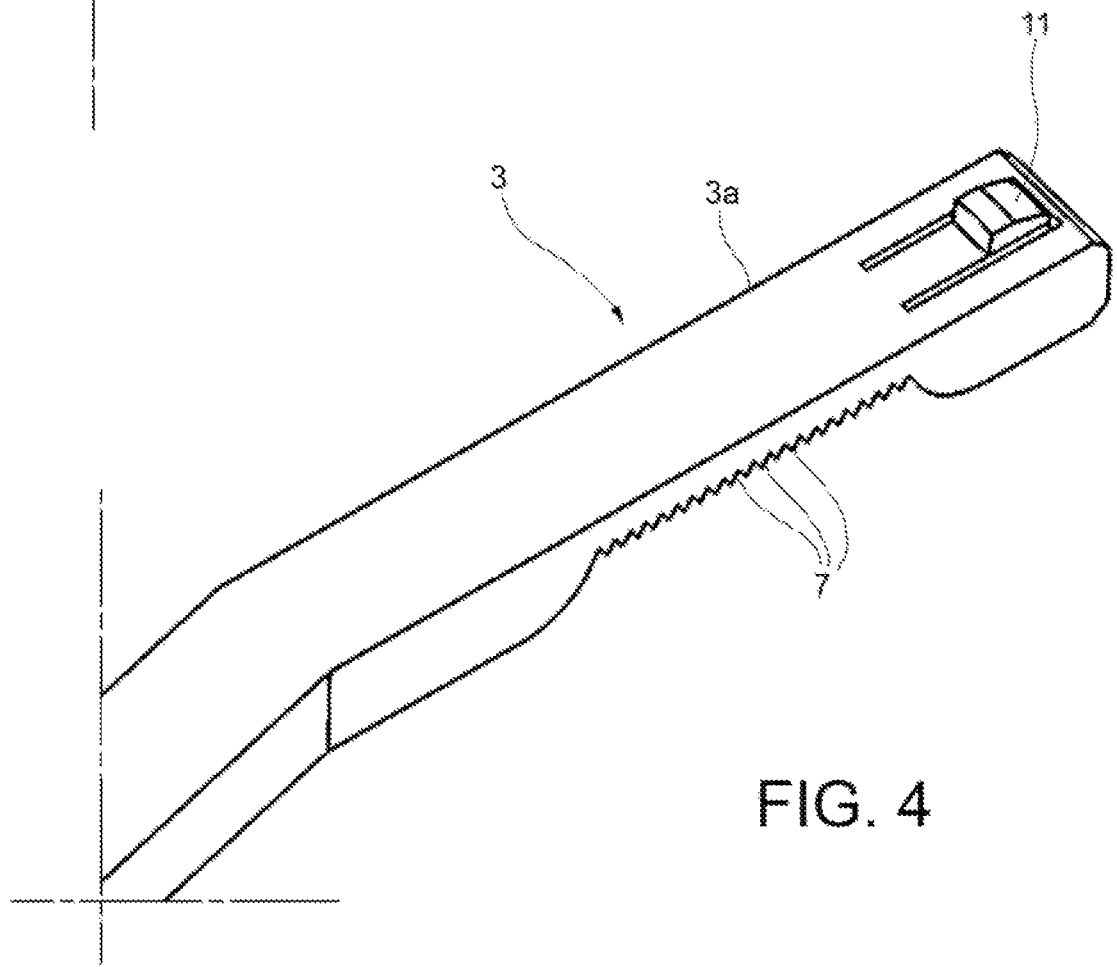

In reference to FIGS. 1 through 7, a tie rod, particularly a tie rod for an air-conditioning unit, is indicated as a whole as item 1. The tie rod comprises a first tie rod part 2 and a second tie rod part 3, both of plastic material, which are shown separately in FIGS. 1-2 and in FIGS. 3-4. The first tie rod part 2 has an end 2a provided with a seat 4, and the second tie rod part 3 has an end 3a designed to be inserted into seat 4 of the first tie rod part 2. The other ends of the first and second tie rod parts 2 and 3, which are not shown in the figures, are designed to connect the tie rod to two corresponding parts between which motion is transmitted. The first and second tie rod parts 2 and 3 are two parts made as a single piece; the items described below are therefore entirely made with one or the other tie rod part.

In addition, the tie rod 1 comprises a joint 5 designed to make a length-adjustable connection between the first tie rod part 2 and the second tie rod part 3.

The joint 5 comprises a first series of ribs 6 made at the end 2a of the first tie rod part 2, and a second series of ribs 7 made at the end 3a of the second tie rod part 3. Ribs 6 and 7 of each series lie transversely with respect to the longitudinal direction of the tie rod 1 and are arranged one after the other in the longitudinal direction of the tie rod 1.

In addition, the joint 5 comprises a clip 8 hinged to the first tie rod part 2 at the end 2a thereof. In particular, the clip 8 is connected to the first tie rod part 2 by a film hinge 9 and can be rotated about an axis parallel to the longitudinal axis of the tie rod 1. The clip 8 carries the first series of ribs 6 and can be folded from an open position (shown in FIGS. 1-2 and 5-6), in which it leaves exposed one side of the seat 4 of the first tie rod part 2, to a closed position (shown in FIG. 7), in which it is snapped closed on the first tie rod part 2, forming a lateral wall of the seat 4 of the first tie rod part 2.

An edge of the clip 8 opposite the film hinge 9 and a corresponding area of the seat 4 of the first tie rod part 2 are provided with snap fitting devices to lock the clip 8 in the closed position. In the illustrated example, the fitting devices include a hook 8a made in the edge of the clip 8 and a corresponding tooth 4a in an external lateral surface of the seat 4.

The seat 4 of the first tie rod part 2 is designed to slidably guide the end 3a of the second tie rod part 3 when said end is inserted into the seat 4. In particular, the seat 4 of the first tie rod part 2 has an approximately rectangular cross section and the end 3a of the second tie rod part 3 has a cross sectional profile matching said cross-section, for example a C-shaped or H-shaped profile.

In addition, the second tie rod part 3 has an elastic end tooth 11 protruding in the opposite direction of the second series of ribs 7 of the second tie rod part 3. A groove 12 capable of receiving the elastic end tooth 11 of the second tie rod part 3 during an initial insertion phase of the second tie rod part 3 into the seat 4, is made in a lateral wall of the seat 4 of the first tie rod part 2. A stop 13 capable of preventing removal of the end 3a of the second tie rod part 3 from the seat 4 of the first tie rod part 2, is defined in the groove 12.

Figure 5:
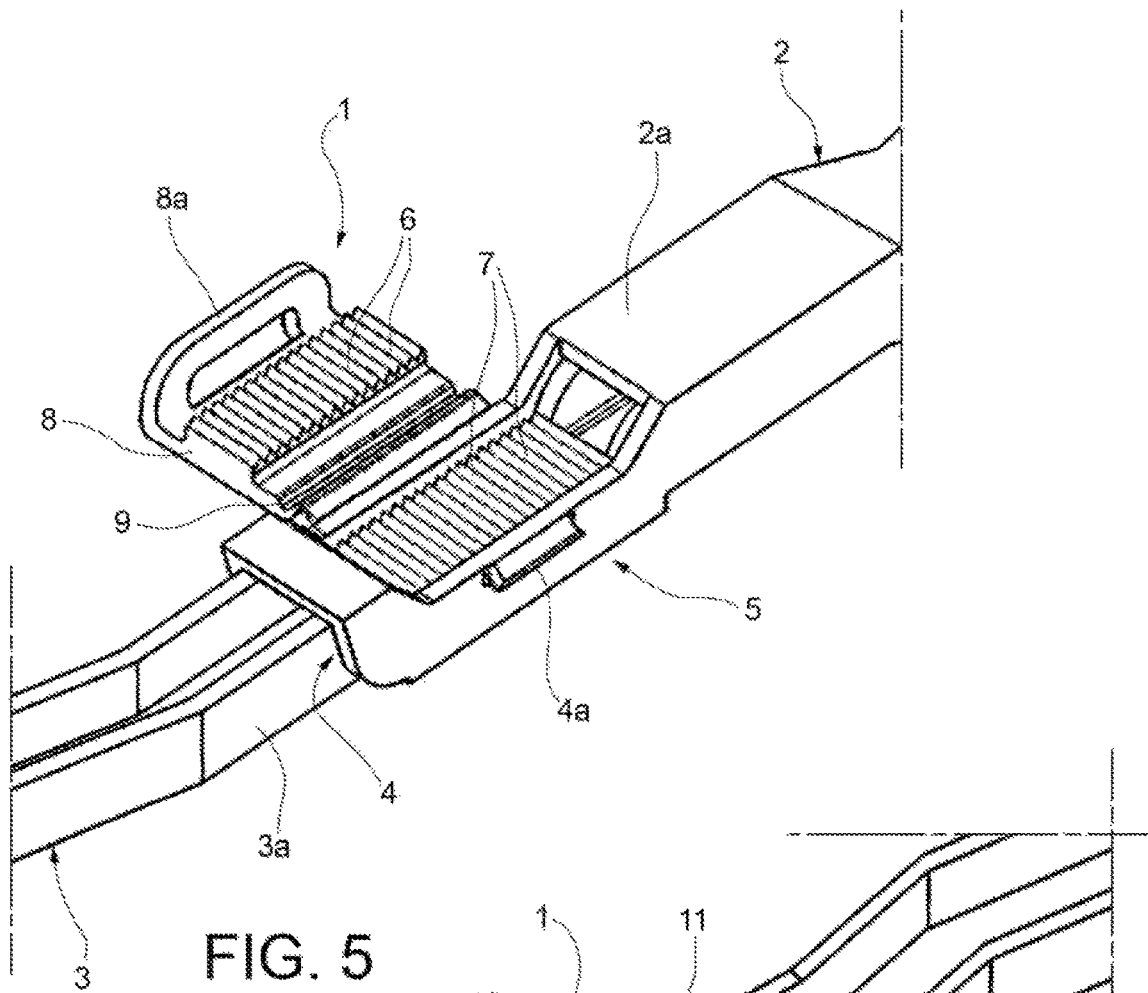
FIGS. 5 and 6 are perspective views from opposite sides of the assembled tie rod with a locking clip in the open position.
Figure 6:
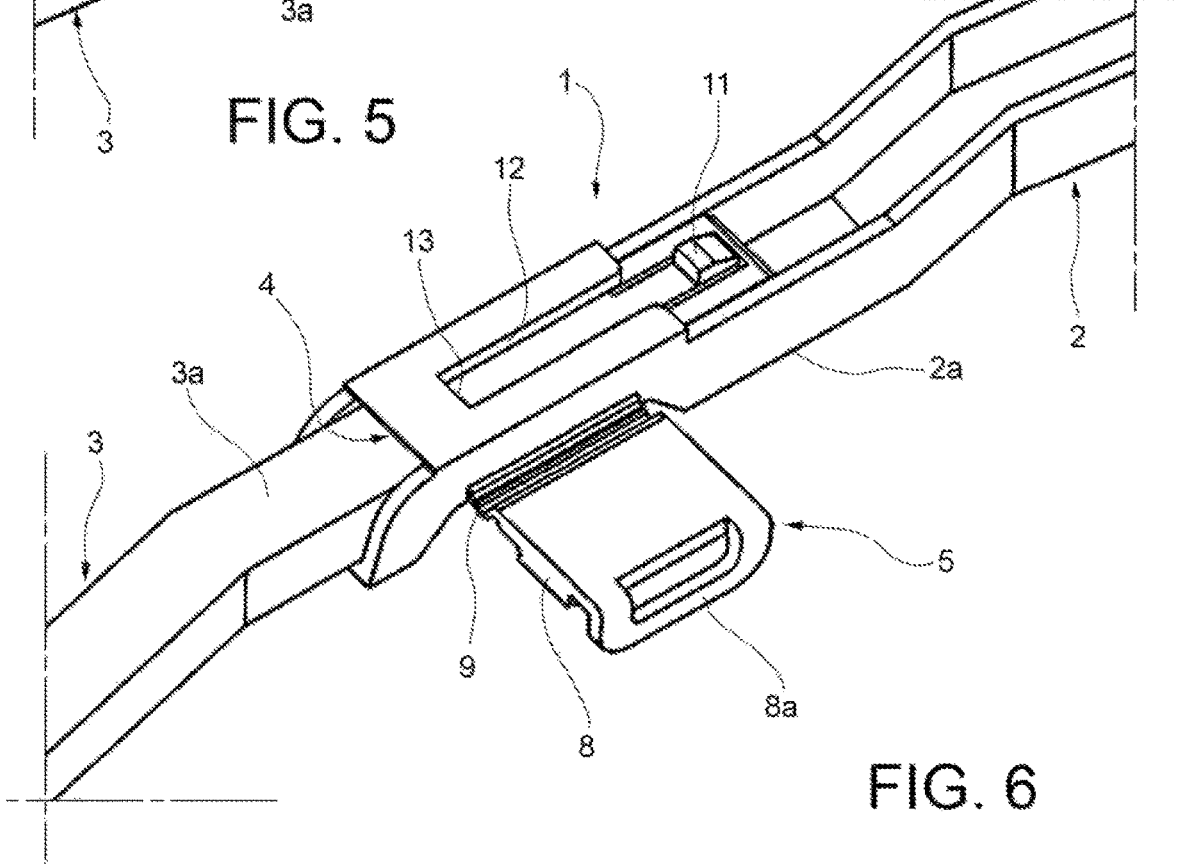

When the end 3a of the second tie rod part 3 is inserted into the seat 4 of the first tie rod part 2, the elastic end tooth 11 is first deflected inward and remains in this position until the tip of the second tie rod part 3 goes beyond the position of the stop 13, allowing the elastic end tooth 11 to snap into the groove 12. Sliding of the end 3a of the second tie rod part 3 is allowed because the clip is in the open position (FIGS. 5 and 6).

Figure 7:
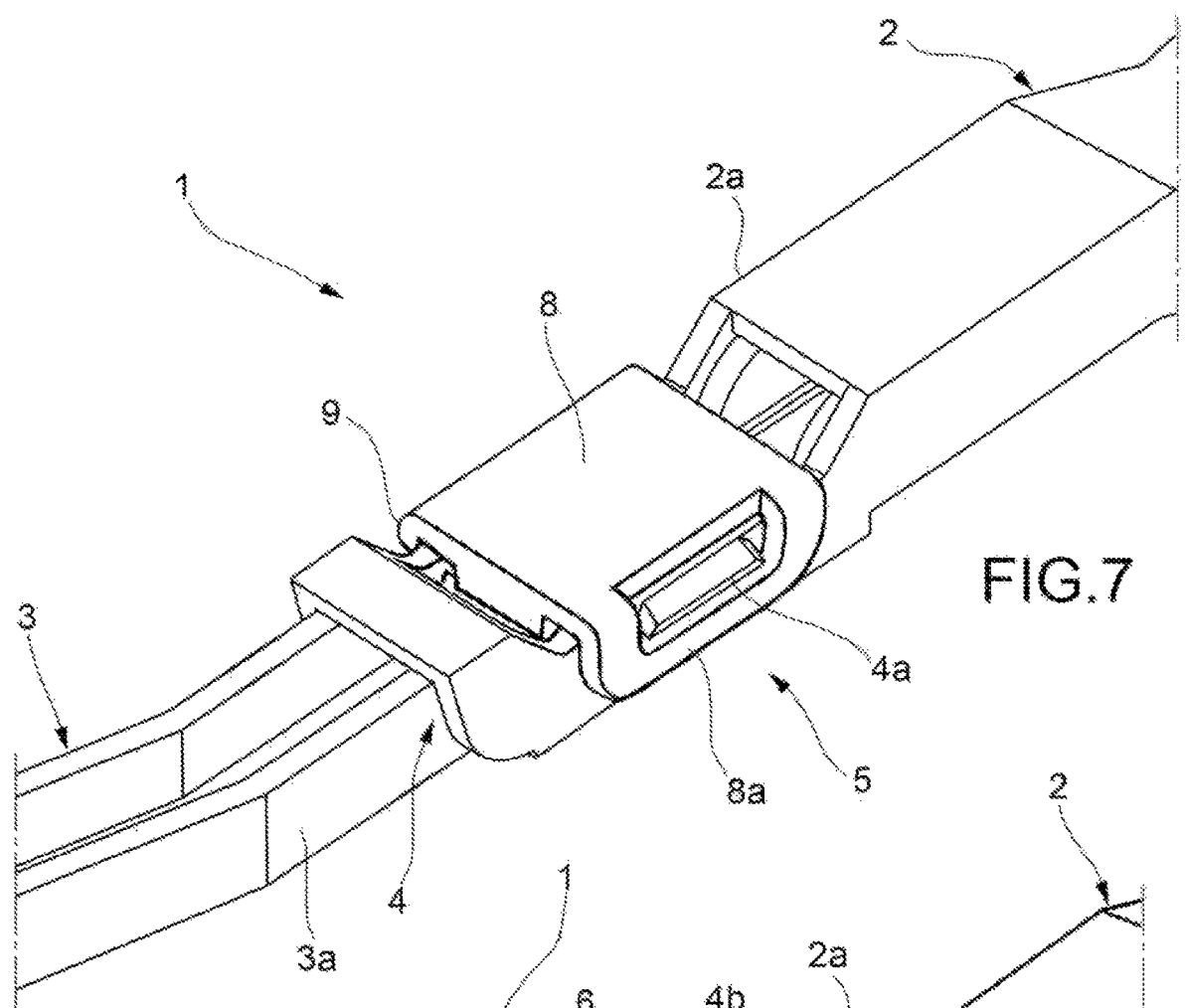
FIG. 7 is a perspective view of the tie rod in FIGS. 5 and 6 with the clip in the closed position.

Once the desired relative longitudinal position of the first and second tie rod parts 2 and 3 is reached, the clip 8 is folded to be snapped closed on first tie rod part 2. In this way, the first series of ribs 6 of the clip 8 is caused to engage with the second series of ribs 7 of the second end part 3 to lock the end 3a of the second tie rod part 3 in the seat 4 of the first tie rod part 2 (FIG. 7).

Figure 8:
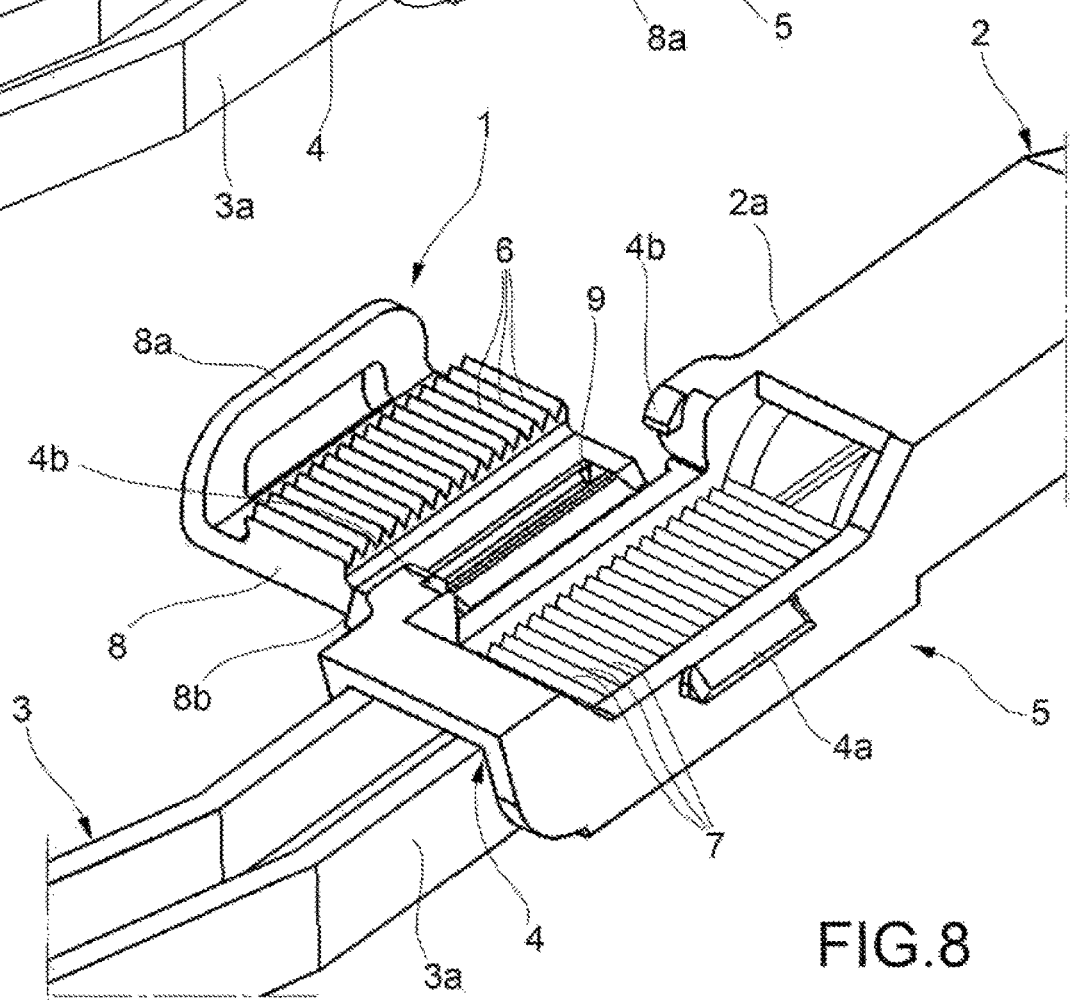
FIG. 8 is a perspective view of a variant of the tie rod according to the invention, with the locking clip in the open position.
Figure 9:
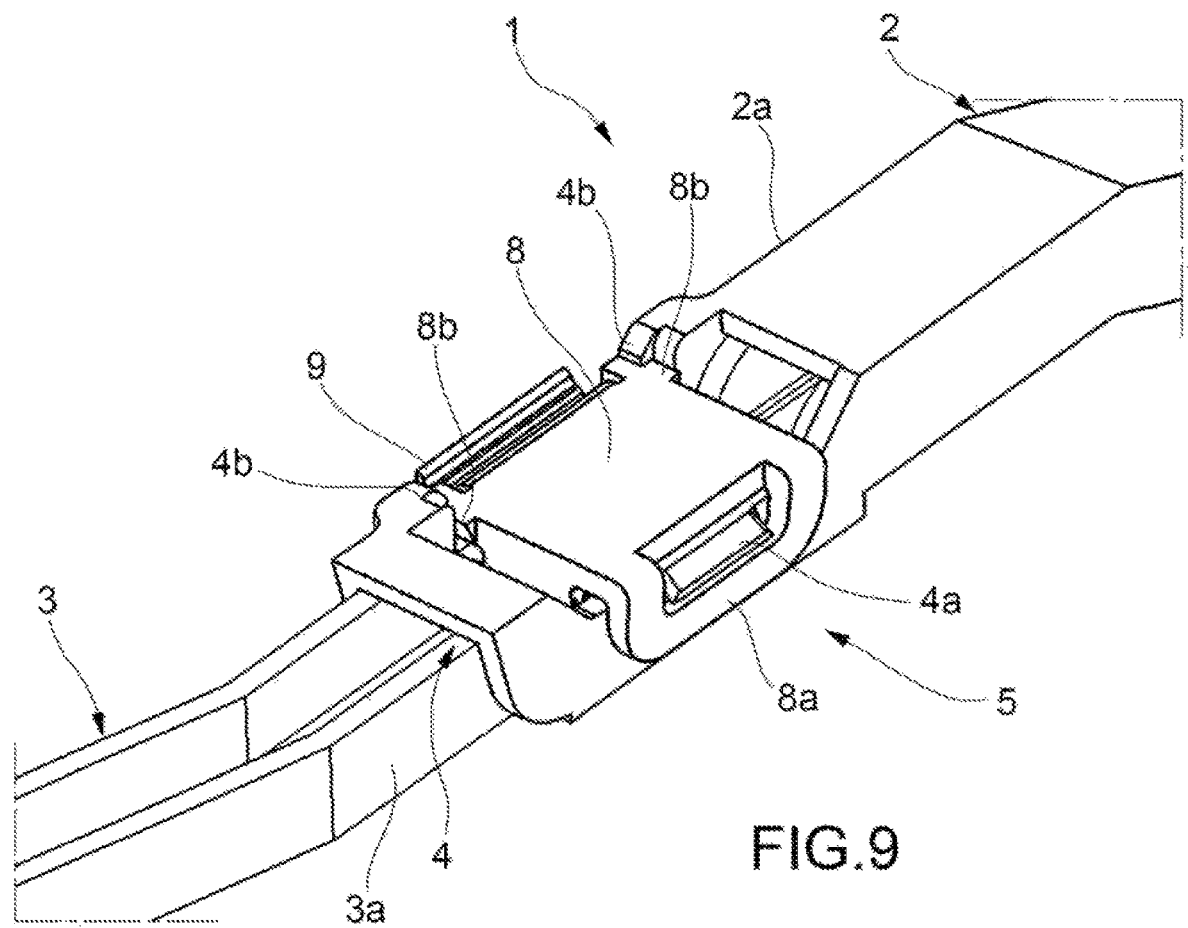
FIGS. 9 and 10 are perspective views of the tie rod in FIG. 8 with the clip in the closed position.
Figure 10:
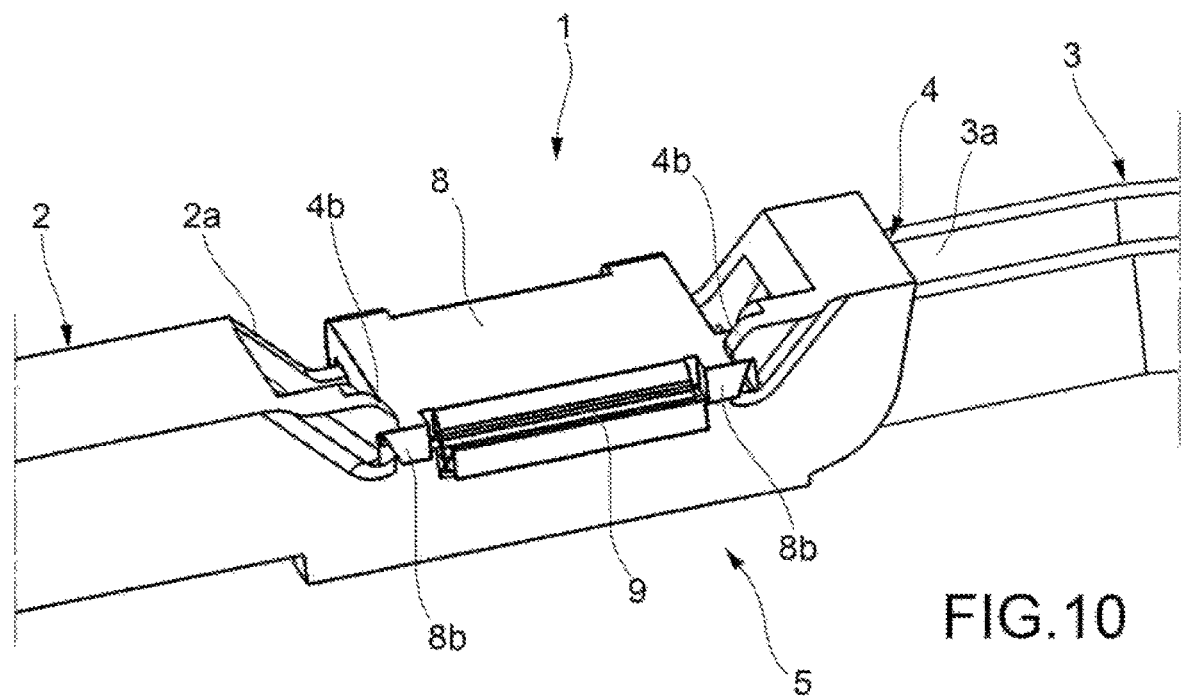

FIGS. 8-10 show a variant of the tie rod described above which is provided with additional parts for hooking the clip 8 in its closed position. In this way it is possible to achieve improved locking of the clip 8.

In particular, both edges of the clip 8 adjacent to the film hinge 9 and corresponding areas of the seat 4 of the first tie rod part are provided with snap fitting devices to lock the clip 8 in its closed position. In the illustrated example, the fitting devices include two teeth 8b made on the lateral edges of the clip 8, and corresponding fastening parts 4b made on the edge of the lateral window of the seat 4.

The present invention is not intended to be limited to the embodiments described and illustrated herein, but it may be modified in terms of shape and arrangement of parts and construction and operation details according to numerous possible variants without departing from the scope of protection as described and claimed herein.

What is claimed is:

1. A tie rod, particularly for an air conditioning unit, the tie rod comprising:
   a first tie rod part and a second tie rod part, both the first tie rod part and the second tie rod part being of plastic material, the first tie rod part having an end provided with a seat, and the second tie rod part having an end designed to be inserted into the seat of the first tie rod part, and
   a joint designed to form an adjustable-length connection between the first tie rod part and the second tie rod part,
   wherein the joint comprises a first series of ribs and a second series of ribs formed on the first tie rod part and the second tie rod part, respectively, ribs of the first series of ribs and of the second series of ribs extending transversely to a longitudinal direction of the tie rod and being arranged one after the other in the longitudinal direction of the tie rod, the first series of ribs being capable of engaging with the second series of ribs to define a relative longitudinal position of the first tie rod part and the second tie rod part with respect to each other,
   wherein the joint further comprises a clip hinged to the first tie rod part and carrying the first series of ribs, the clip being foldable to snap onto the first tie rod part to lock the end of the second tie rod part within the seat of the first tie rod part, and
   wherein the seat of the first tie rod part is designed to slidably guide the end of the second tie rod part when the clip is in an open position.

2. The tie rod of claim 1, wherein the clip, in a closed position, forms a wall of the seat of the first tie rod part.

3. The tie rod of claim 2, wherein the second tie rod part has an elastic end tooth protruding in an opposite direction of the second series of ribs of the second tie rod part, wherein a groove capable of receiving the elastic end tooth is defined in the wall of the seat of the first tie rod part, with a stop being defined in the groove and being capable of preventing removal of the end of the second tie rod part from the seat in the first tie rod part.

4. The tie rod of claim 1, wherein the clip is connected to the first tie rod part by a film hinge.

5. The tie rod of claim 4, wherein an edge of the clip opposite the film hinge and a corresponding area of the seat of the first tie rod part are provided with snap fitting devices to lock the clip in a closed position.

6. The tie rod of claim 4, wherein at least one edge of the clip adjacent to the film hinge and a corresponding area of the seat of the first tie rod part are provided with snap fitting devices to lock the clip in a closed position.

7. The tie rod of claim 1, wherein the clip rotates about an axis parallel to a longitudinal axis of the tie rod.

8. The tie rod of claim 1, wherein the seat of the first tie rod part has an approximately rectangular cross section and the end of the second tie rod part has a cross sectional profile matching the approximately rectangular cross-section.

9. The tie rod of claim 1, wherein the clip and the first series of ribs are made of a single part together with the first tie rod part and wherein the second series of ribs is made of a single part together with the second tie rod part.

\* \* \* \* \*